(12) United States Patent
Hahn et al.

(10) Patent No.: US 8,584,725 B2
(45) Date of Patent: Nov. 19, 2013

(54) RUBBER COMPOSITION, PREPARATION AND TIRE WITH COMPONENT

(75) Inventors: Bruce Raymond Hahn, Hudson, OH (US); Rebecca Lee Dando, Uniontown, OH (US); Larry Ashley Gordon, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 390 days.

(21) Appl. No.: 12/884,296

(22) Filed: Sep. 17, 2010

(65) Prior Publication Data

US 2012/0067495 A1 Mar. 22, 2012

(51) Int. Cl.
*B60C 1/00* (2006.01)
*C08C 19/20* (2006.01)
*C08C 19/22* (2006.01)
*C08C 19/26* (2006.01)
*C08C 19/28* (2006.01)

(52) U.S. Cl.
USPC ........... 152/537; 152/525; 152/541; 152/547; 152/564; 524/572; 524/575; 524/576; 525/332.7; 525/332.9; 525/333.1; 525/333.2; 525/370; 525/375

(58) Field of Classification Search
USPC .......... 152/525, 564, 537, 541, 547; 524/572, 524/576, 575; 525/332.7, 375, 332.9, 525/333.1, 333.2, 370
See application file for complete search history.

(56) References Cited

U.S. PATENT DOCUMENTS

| | | | |
|---|---|---|---|
| 3,334,103 A | 8/1967 | Feldman et al. | |
| 6,084,015 A | 7/2000 | Chino et al. | 524/189 |
| 6,194,509 B1 * | 2/2001 | Lin et al. | 524/493 |
| 7,465,769 B2 | 12/2008 | Esseghir et al. | 525/331.3 |
| 2008/0051496 A1 | 2/2008 | Debaud et al. | 524/236 |
| 2009/0069469 A1 * | 3/2009 | Esseghir et al. | 524/99 |

* cited by examiner

*Primary Examiner* — Roberto Rabago
(74) *Attorney, Agent, or Firm* — Henry C. Young, Jr.

(57) ABSTRACT

The invention relates to a cured rubber composition, its preparation and a tire with a component of such rubber composition.

18 Claims, No Drawings

RUBBER COMPOSITION, PREPARATION AND TIRE WITH COMPONENT

FIELD OF THE INVENTION

The invention relates to a cured rubber composition, its preparation and a tire with a component of such rubber composition.

BACKGROUND OF THE INVENTION

For production of tires and other vulcanized rubber goods, it is desirable to provide uncured rubber compositions with relatively low viscosity in order to more efficiently speed manufacturing processes such as, for example, rubber extrusion, rubber calendaring, rubber milling, injection and mold shaping, before the rubber product is in its final state for vulcanization.

However, a negative aspect of lowering the viscosity of the formative uncured rubber composition is that the stiffness, or modulus, of the finally cured rubber composition may also be lowered which may be undesirable for many rubber products.

For this invention it is desired to evaluate whether processing an uncured rubber composition at a relatively lower uncured viscosity (uncured G' value), or by substantially maintaining the relatively low viscosity, such as for example during its high shear mixing, or processing, followed by providing followed by providing the sulfur cured rubber composition with a suitable stiffness, or cured G' value can be accomplished.

For such evaluation, a two step process is envisioned.

For the first step, use of a controlled free radical agent (CFR) is contemplated for use in providing a relatively low viscosity (Mooney viscosity) of the uncured rubber composition after its mixing and during its subsequent processing such as, for example, high shear mixing, or processing.

While the mechanism may not be completely understood, for such first step, it is envisioned that free radicals are formed on the uncured elastomer, particularly for natural cis 1,4-polyisoprene rubber, during its mixing process (with other compounding ingredients) under high shear conditions at an elevated temperature such as, for example, at a temperature in a range of from about 140° C. to about 170° C. As the rubber composition cools, such as for example to a temperature below 120° C., an added CFR agent may have an ability to react and form reversible chemical bonds with the radicals which had been formed on the elastomer polymer chains during the mixing process.

It is envisioned that such phenomenon of tying up the formed free radicals on the elastomer chain by the CFR agent prevents or retards a viscosity build up of the uncured rubber composition.

Later, however, as the elastomer composition is cured, or vulcanized, an elevated temperature, such as for example above 120° C., and perhaps in a range of from about 140° C. to about 170° C., the CFR agent is envisioned as being able to break away from the elastomer chain in a sense that the aforesaid reversible chemical bonds between the CFR and created free radicals on the elastomer's polymer chain are broken to thereby leave free radicals on the elastomer's polymer chain.

For this evaluation and invention, it is envisioned that the controlled free radical agent (CFR agent) may be, for example, a chemical compound containing a nitroxide free radical such as, for example, 2,2,6,6-tetramethylpiperidine-1,4-diol (4-hydroxyTEMPO) and derivatives thereof so long as said derivatives contain nitroxide free radicals and 2,2,5,5-tetramethyl-1-pyrrolidinyloxy (PROXYL) and derivatives thereof so long as said derivatives contain nitroxide free radicals which are reactive with the aforesaid free radicals created on the elastomer's polymer chain. An exemplary reference may be found as G. Moad, et al, "Tetrahedron Letters", Volume 22, Page 1165 (1981) which refers to free radical polymerization inhibitors.

Historically, 4-hydroxyTEMPO has been used as a free radical scavenger and in various rubber compositions. For example, see U.S. Pat. Nos. 3,334,103; 6,084,015; and 6,194,509; U.S. Application Publication Nos. 2008/0051496; 2008/0085973; and 2009/0069469 as well as literature references "Mechanisms of Antioxidant Action", L. P. Nethsinghe, et al, University of Aston in Birmingham, England, received Jan. 15, 1984, *Rubber Chemistry and Technology*, Volume 57, Pages. 779 through 791; "Mechanisms of Antioxidant Action", H. S. Dweik, et al, University of Aston in Birmingham, England, received Dec. 2, 1983, *Rubber Chemistry and Technology*, Volume 57, Pages 908 through 917; "Mechanisms of Antioxidant Action" H. S. Scott, et al, received Apr. 20, 1983; *Rubber Chemistry and Technology*, Volume 57, Pages 735 through 743.

For the second step of evaluation, a free radical reactive compound (referred to herein as "FRRC") is added to the CFR treated rubber composition (thereby added subsequent to the CFR treatment and in a later, and lower temperature mixing stage, such as a productive mixing stage where sulfur curatives are added, at a temperature in a range of, for example, from about 90° C. to about 115° C.).

Such free radical reactive compounds (FRRC's) have heretofore sometimes been used as curative co-agents when used in combination with various organoperoxides for curing various organoperoxide curable rubber compositions. Such FRRC's have been thought to increase cure rates as well as crosslink density of the various rubber compositions during the curing of the peroxide curable rubber compositions with various organoperoxides. However, for this evaluation, the FRRC agent is to be used exclusive of an organoperoxide.

For this experiment, the FRRC's are evaluated for use in reacting with free radicals formed on the sulfur curable elastomer chain by liberation of the CFR material from the elastomer chain at an elevated temperature above perhaps 120° C. which would be experienced during sulfur vulcanization of the rubber composition. In such manner, then, the added FRRC becomes attached to the elastomer's polymer chain in place of the CFR material as it reacts with free radicals on the elastomer's polymer chain left by the liberation of the CFR material. It is envisioned that the attached FRRC promotes linkages between the polymer chains to significantly increase the molecular weight of the elastomer and to thereby increase various physical properties of the finally sulfur cured rubber composition.

Representative of various FRRC's are, for example, zinc acrylates, di-acrylates and tri-acrylates; triallyl cyanurates; triallyl phosphates; low molecular weight high vinyl polybutadiene resins, having, for example, a vinyl content in a range of from about 40 to about 80 percent, which are considered as being reactive with the aforesaid free radicals on the elastomer chain.

Representative examples of such FRRC's are, for example, zinc dimethacrylate, zinc methacrylate, trimethylolpropane trimethyacrylate, triallyl cyanurate, triallyl phosphate and low molecular weight 1,2-vinyl polybutadiene resin having a vinyl content in a range of from about 40 to about 80 percent.

As indicated, it is envisioned that the presence of the FRRC's results in the ability of the very reactive radicals formed on the polymer chain of the elastomer, upon release of the CFR agent, to react with and combine several of the polymer chains together thereby resulting in a relatively dramatic increase in the effective molecular weight of the elastomer and thereby the modulus of the cured rubber composition to an extent not normally possible through traditional rubber processing and vulcanization methods.

For this invention, then, it is proposed to evaluate providing a more easily processable uncured rubber composition (e.g. more easily extruded) by lowering its viscosity, or substantially maintaining a lower rubber viscosity (e.g. its uncured rubber G' value) for rubber processing purposes and subsequently provide a relatively high modulus cured rubber composition (relatively high cured rubber G' value). Such rubber composition might be used, for example, for tire components where a stiff rubber composition may be used for an advantage, such as, for example, internal tire sidewall components such as for example apex and sidewall stiffening component spaced apart from a tire sidewall apex; coating for metal wire tire cord bead; coating for wire tire cord circumferential belt positioned between the tire tread and tire carcass; and tire tread.

Accordingly, it is an aspect of this invention to undertake such evaluation.

In the description of this invention, the terms "rubber" and "elastomer" may be used interchangeably unless otherwise indicated. The terms "rubber composition", "compounded rubber" and "rubber compound", may be used interchangeably to refer to "rubber which has been blended or mixed with various ingredients" and the term "compound" relates to a "rubber composition" unless otherwise indicated. Such terms are well known to those having skill in the rubber mixing or rubber compounding art.

In the description of this invention, the term "phr" refers to parts of a respective material per 100 parts by weight of rubber, or elastomer. The terms "cure" and "vulcanize" may be used interchangeably unless otherwise indicated.

SUMMARY AND PRACTICE OF THE INVENTION

In accordance with this invention a method of preparing a rubber composition comprises:

(A) mixing (e.g. high shear mixing) of a rubber composition containing a sulfur curable elastomer (e.g. in an internal rubber mixer) at an elevated temperature in a range of from about 140° C. to about 180° C., and sufficient to create free radicals on the elastomer chain, in an at least one sequential preparatory rubber mixing stage in the absence of sulfur and sulfur curatives (e.g. non-productive rubber mixing stage in the absence of sulfur curatives);

(B) mixing sulfur curatives with the rubber composition in a subsequent productive rubber mixing stage (e.g. in an internal rubber mixer) to a temperature in a range of from about 90° C. to about 115° C.;

wherein the rubber composition is cooled to a temperature below about 40° C. after each of said mixing stages;

wherein a controlled free radical agent (CFR agent) is added to said rubber composition in at least one of said preparatory rubber mixing stage(s), wherein said CFR agent is a free radical-containing nitroxide compound reactive with said created free radicals on said elastomer chain to thereby form a CFR treated elastomer;

(C) sulfur curing (therefore exclusive of organoperoxide curing) said mixed rubber composition at an elevated temperature in a range of from about 130° C. to about 180° C. during which said CFR agent is liberated (released) from said elastomer at the elevated temperature to create subsequent free radicals on the elastomer chain;

an improvement which comprises addition of a free radical reactive compound (FRRC) to said rubber composition containing said CFR treated elastomer in said productive rubber mixing stage, wherein said FRRC is reactive with said subsequently created free radicals formed on said elastomer chain by liberation of said CFR agent at said elevated processing temperature, to thereby form a FRRC treated elastomer;

wherein said CFR agent is comprised of 2,2,6,6-tetramethylpiperidine-1,4-diol and derivatives thereof so long as said derivatives contain nitroxide free radicals (and are reactive with said created free radicals on said elastomer chain) and 2,2,5,5-tetramethyl-1-pyrrolidinyloxy and derivatives thereof so long as said derivatives contain nitroxide free radicals (and are reactive with said created free radicals on said elastomer chain), preferably said 2,2,5,5-tetramethyl-1-pyrrolidinyloxy;

wherein said FRRC is comprised of at least one of, zinc acrylates, di-acrylates and tri-acrylates; triallyl cyanurates; triallyl phosphates; and low molecular weight high vinyl polybutadiene resin having a vinyl content in a range of from about 40 to about 80 percent.

In further accordance with this invention a rubber composition prepared by such method is provided.

In additional accordance with this invention such rubber composition is sulfur cured.

In further accordance with this invention, a tire is provided having at least one component comprised of said rubber composition.

In additional accordance with this invention, said tire component is at least one of internal tire sidewall components such as for example apex and sidewall stiffening components spaced apart from a tire sidewall apex; coating for metal wire cord tire beads; coating for wire cord circumferential belts positioned between the tire tread and tire carcass; and tire tread.

In one embodiment, the rubber composition of this invention, and component of a tire comprised of such rubber composition contains particulate filler reinforcement comprised of, based upon parts by weight per 100 parts by weight rubber (phr):

(A) from about 45 to about 110 phr of rubber reinforcing filler comprised of:
  (1) rubber reinforcing carbon black, or
  (2) a combination of rubber reinforcing carbon black and synthetic amorphous precipitated silica (e.g. precipitated silica) which contains from about 20 to about 80 phr of said silica, and (B) silica coupler having a moiety reactive with hydroxyl groups (e.g. silanol groups) on said silica and another different moiety interactive with said diene-based elastomer(s).

The combination of the sequential treatment of the elastomer with the CFR agent, or material, to combine with the free radicals formed on the elastomer during high shear mixing, followed by subsequent treatment of the elastomer with the FRRC agent, or material, reacting with free radicals formed by liberation of the CFR material from the elastomer at an elevated temperature at an elevated temperature during sulfur vulcanization, or curing, of the rubber composition appears to be synergistic in nature in a sense of providing a more processable uncured rubber composition (lower G' value) combined with a relatively high stiffness for the sulfur cured rubber composition (relatively high G' value).

It was observed and thereby discovered that such not phenomenon was not achieved by inclusion of the CFR or FRRC material alone. Moreover, the effect was accomplished by their sequential treatment of the elastomer, namely first the CFR treatment followed by the FRRC treatment by taking advantage of sequential free radical creation on the elastomer chain.

In practice, the precipitated silica is normally used in combination with a coupling agent having a moiety reactive with hydroxyl groups contained on the surface of the silica (e.g. silanol groups) and another moiety interactive with said diene-based elastomers.

A coupling agent for such silica may, for example, be a bis(3-trialkoxysilylalkyl) polysulfide which contains an average of from 2 to 4, alternately an average of from 2 to about 2.6 or an average of from about 3.4 to about 3.8, connecting sulfur atoms in its polysulfidic bridge. Representative of such coupling agent is for example, bis(3-triethoxysilylpropyl) polysulfide as being, for example, comprised of a bis(3-triethoxysilylpropyl) tetrasulfide, namely with the polysulfidic bridge comprised of an average of from about 3.2 to about 3.8 connecting sulfur atoms or a bis(3-triethoxysilylpropyl) disulfide with the polysulfidic bridge comprised of an average of from about 2.1 to about 2.6 connecting sulfur atoms.

Alternately, such coupling agent may be an organomercaptosilane (e.g. an alkoxyorganomercaptosilane), and particularly an alkoxyorganomercaptosilane having its mercapto function reversibly capped. Various of such alkoxyorganomercaptosilane coupling agents are well known to those having skill in such art.

In practice, the synthetic amorphous silica may be selected from aggregates of precipitated silica, which is intended to include precipitated aluminosilicates as a co-precipitated silica and aluminum.

Such precipitated silica is, in general, well known to those having skill in such art. The precipitated silica aggregates may be prepared, for example, by an acidification of a soluble silicate, e.g., sodium silicate, in the presence of a suitable electrolyte and may include co-precipitated silica and a minor amount of aluminum.

Such silicas might have a BET surface area, as measured using nitrogen gas, such as, for example, in a range of about 40 to about 600, and more usually in a range of about 50 to about 300 square meters per gram. The BET method of measuring surface area is described in the *Journal of the American Chemical Society*, Volume 60 (1938).

The silica might also have a dibutylphthalate (DBP) absorption value in a range of, for example, about 50 to about 400 cm$^3$/100 g, alternately from about 100 to about 300 cm$^3$/100 g.

Various commercially available precipitated silicas may be considered for use in this invention such as, only for example herein, and without limitation, silicas from PPG Industries under the Hi-Sil trademark with designations Hi-Sil 210™, Hi-Sil 243™, etc; silicas from Rhodia as, for example, Zeosil 1165 MPT™ and Zeosil 165GR™, silicas from J. M. Huber Corporation as, for example, Zeopol 8745 and Zeopol 8715, silicas from Degussa AG with, for example, designations VN2™, VN3™ and Ultrasil 7005™ as well as other grades of precipitated silica.

Various rubber reinforcing carbon blacks might be used for the tread rubber compositions. Representative of various rubber reinforcing blacks may be referred to by their ASTM designations such as for example, although not intended to be limiting, N110, N121 and N234. Other rubber reinforcing carbon blacks may be found, for example, in *The Vanderbilt Rubber Handbook* (1978), Page 417.

Representative of various of said sulfur curable rubbers, or elastomers, are, for example, polymers and copolymers of isoprene and 1,3-butadiene and copolymers of styrene with at least one of isoprene and 1,3-butadiene. Representative of such elastomers are, for example, cis 1,4-polyisoprene rubber, cis 1,4-butadiene rubber, styrene-butadiene rubber (prepared, for example, by organic solvent solution polymerization or by aqueous emulsion polymerization).

In practice, as heretofore indicated, the rubber composition may be prepared in at least one preparatory (non-productive) mixing step in an internal rubber mixer, often a sequential series of at least two separate and individual preparatory internal rubber mixing steps, or stages, in which the diene-based elastomer is first mixed with the prescribed silica and/or carbon black as the case may be in the presence of the CFR agent.

In a final mixing step (productive mixing step) in an internal rubber mixer, curatives (sulfur and sulfur vulcanization accelerators) are blended, together with the FRRC, at a lower temperature and for a substantially shorter period of time.

It is conventionally required after each internal rubber mixing step that the rubber mixture is actually removed from the rubber mixer and cooled to a temperature below 40° C., perhaps to a temperature in a range of about 20° C. to about 40° C. and the rubber composition then added back to an internal rubber mixer for the next sequential mixing step, or stage.

Such non-productive mixing, followed by productive mixing is well known by those having skill in such art.

The forming of a tire component is contemplated to be by conventional means such as, for example, by extrusion of rubber composition to provide a shaped, unvulcanized rubber component a procedure well known to those having skill in such art.

It is understood that the tire, as a manufactured article, is prepared by shaping and sulfur curing the assembly of its components at an elevated temperature (e.g. 140° C. to 170° C.) and elevated pressure in a suitable mold. Such practice is well known to those having skill in such art.

The following Example is provided to further understand the invention.

EXAMPLE I

Rubber compositions are prepared for evaluating an effect of first treating a sulfur curable elastomer with a controlled free radical agent (CFR agent) with high shear mixing of a rubber composition containing said sulfur curable elastomer and thereafter treating the treated elastomer with a free radical reactive compound (FRRC).

Control rubber Sample A is prepared which contains a sulfur curable elastomer without CFR agent and FRRC.

Comparative rubber Composition E contains a sulfur curable elastomer treated with a FRRC material as zinc dimethacrylate without the 4-hydroxyTEMPO CFR agent.

Comparative rubber Composition F contains a sulfur curable elastomer treated with a CFR agent as 4-hydroxyTEMPO without the zinc dimethacrylate FRRC material.

Experimental rubber Compositions B, C and D contain a sulfur curable elastomer treated with a combination of various amounts of said CFR agent as 4-hydroxyTEMPO and thereafter further treated with a FRRC material as zinc dimethacrylate.

The rubber compositions are prepared by mixing the ingredients in sequential non-productive (NP) and productive (PR) mixing steps in one or more internal rubber mixers.

The basic recipe for the rubber Samples is presented in the following Table 1 and reported in parts by weight unless otherwise indicated.

TABLE 1

| | Parts |
|---|---|
| First Non-Productive Mixing Step (NP1), (mixed to about 170° C.) | |
| Natural cis 1,4-polyisoprene rubber[1] | 100 |
| 4-hydroxyTEMPO (CFR agent)[2] | 0 to 2 |
| Carbon black (N347)[3] | 50 |
| Zinc oxide | 3 |
| Fatty acid[4] | 1 |
| Productive Mixing Step (PR), (mixed to about 120° C.) | |
| Sulfur | 1.5 |
| Sulfur cure accelerators as sulfenamide | 1 |
| Zinc dimethacrylate (FRRC) | 0 to 3 |

[1]Natural rubber as SMR 20
[2]4-hydroxyTEMPO obtained as 4-hydroxyTEMPO from Evonik
[3]Rubber reinforcing carbon black as N347, an ASTM designation
[4]Fatty acid comprised of stearic acid, palmitic and oleic acid The following Table 2 illustrates cure behavior and various physical properties (some values rounded) of rubber compositions using the formulation reflected in Table 1, namely rubber Samples A through F, with the parts and percentages by weight unless otherwise indicated.

TABLE 2

| | Samples | | | | | |
|---|---|---|---|---|---|---|
| | Control | Experimental | | | Comparative | |
| Materials | A | B | C | D | E | F |
| First Non-Productive Mixing Stage (NP1) | | | | | | |
| 4-hydroxyTEMPO (CFR Agent) | 0 | 1 | 1.5 | 2 | 0 | 2 |
| Productive Mixing Stage (PR) | | | | | | |
| Zinc dimethacrylate (FRRC) | 0 | 1.5 | 2.3 | 3 | 3 | 0 |
| RPA[1] 100° C., 15% Strain, 0.833 Hz | | | | | | |
| Uncured rubber G' (KPa) | 217 | 124 | 109 | 112 | 182 | 122 |
| RPA[1] 100° C., 3% Strain, 1 Hz | | | | | | |
| Cured rubber G' (KPa) | 1218 | 1722 | 1818 | 1891 | 1886 | 1432 |
| Tan delta | 0.12 | 0.11 | 0.13 | 0.14 | 0.1 | 0.1 |
| Rheometer, 150° C. | | | | | | |
| Minimum torque (dNm) | 2.57 | 1.55 | 1.38 | 1.41 | 2.18 | 1.53 |
| Maximum torque (dNm) | 13.49 | 19.57 | 18.92 | 19.09 | 19.69 | 15.58 |
| Delta torque (dNm) | 10.92 | 18/02 | 17.54 | 17.68 | 17.51 | 14.05 |
| Stress-Strain[2] 30 min. at 150° C. | | | | | | |
| 100% modulus, ring (MPa) | 1.9 | 3.3 | 3.7 | 3.9 | 3.4 | 2.7 |
| Tensile strength (MPa) | 18.4 | 25.6 | 25.3 | 23.6 | 26.9 | 17.3 |

[1]Data according to Rubber Process Analyzer as RPA 2000 ™ (Alpha Technologies company)
[2]ASTM D412-062(a)

It can be seen from Table 2 that Experimental rubber Samples B, C and D, which used the combination of the CFR material can FRRC material, enabled a beneficial combination of lower uncured G' values for the uncured rubber composition and higher cured G' values for the cured rubber composition when compared to Control rubber Sample A which was not achieved by treatment by the CFR material or FRRC material alone.

This confirms the essence of aforesaid evaluation and therefore the discovery of this invention.

The following Table 3 illustrates more dramatically the comparative G' values for the uncured and cured rubber Samples using the above G' data presented in Table 2.

TABLE 3

| Rubber Samples | Uncured G' (MPa) | Cured G' (MPa) |
|---|---|---|
| Control rubber Sample A | 217 | 1218 |
| Experimental rubber Sample B | 124 | 1722 |
| Experimental rubber Sample C | 109 | 1818 |
| Experimental rubber Sample D | 112 | 1891 |
| Comparative rubber Sample E | 182 | 1886 |
| Comparative rubber Sample F | 122 | 1432 |

It can be seen from the above Table 3 that Control rubber Sample A (without treatment of either of the CFR agent or FRRC) presented a relative high G' value of 217 MPa for the uncured rubber composition and a G' value of 1218 MPa for the cured rubber composition.

It can be seen from Table 3 that Comparative rubber Sample E (with the FRRC treatment without a CFR treatment resulted in a relatively high uncured G' value of 182 MPa, although lower than the G' value of 217 MPa for Control rubber Sample A, and a relatively high cured G' value of 1886 MPa as compared to Control rubber Sample A as well as Experimental rubber Samples B, C and D.

This shows that for the treatment of the rubber composition with the FRRC without a pre-treatment with a CFR agent such as 4-hydroxyTEMPO, the uncured G' value for the uncured rubber composition increases as well as the cured G' value of the cured rubber composition, which is not a desired effect.

It can further be seen from Table 3 that Comparative rubber Sample F (with the CFR agent treatment without a subsequent FRRC treatment of the rubber composition) had a relatively low uncured G' value of 122 for the uncured rubber composition together with a relatively low cured G' of 1432 for the cured rubber composition, as compared to Control rubber Composition A which is also not a desired effect.

This shows that the CFR agent treatment, namely the 4-hydroxyTEMPO treatment, effectively enabled a lowering of the uncured rubber G' with, however, the cured rubber G' being only somewhat increased.

However, it is additionally seen from Table 3 that the sequential CFR treatment followed the FRRC treatment for Experimental rubber Samples B, C and D produced a more dramatic result with significantly lower uncured rubber G's ranging from 112 to 124 MPa, which are substantially lower than the uncured G' of 217 for uncured Control rubber Sample A while producing relatively high G's for the cured rubber compositions ranging from 1722 to 1891 MPa.

This is considered herein to be significant in a sense that it is observed that only the combination of the sequential treatment of the rubber composition with the CFR agent, namely the 4-hydroxyTEMPO, followed by treatment with the FRRC resulted in the combination of lowest uncured G' and high cured G' for the Experimental rubber Samples.

Accordingly, this Example demonstrates a feasibility and benefit of providing an uncured rubber composition that can be relatively easily processed but still achieve a high level of cured modulus or stiffness (G') of a cured rubber composition by providing a CFR agent treated sulfur curable elastomer and subsequently treating the treated elastomer with the FRRC material.

This is considered as confirming and validating the essence and showing of aforesaid evaluation and therefore the discovery of this invention.

While certain representative embodiments and details have been shown for the purpose of illustrating the subject invention, it will be apparent to those skilled in this art that various changes and modifications can be made therein without departing from the scope of the subject invention.

What is claimed is:

1. A method of preparing a rubber composition comprises:
   (A) mixing of rubber composition containing a sulfur curable elastomer at an elevated temperature in a range of from about 140° C. to about 180° C., and sufficient to create free radicals on the elastomer chain, in an at least one sequential preparatory rubber mixing stage in the absence of sulfur and sulfur curatives;
   (B) mixing sulfur curatives with the rubber composition in a subsequent productive rubber mixing stage to a temperature in a range of from about 90° C. to about 115° C.;
   wherein the rubber composition is cooled to a temperature below about 40° C. after each of said mixing stages;
   wherein a controlled free radical agent (CFR agent) is added to said rubber composition in at least one of said preparatory rubber mixing stage(s), wherein said CFR agent is a free radical-containing nitroxide compound reactive with said created free radicals on said elastomer chain to thereby form a CFR treated elastomer;
   (C) sulfur curing said mixed rubber composition at an elevated temperature in a range of from about 130° C. to about 180° C. during which said CFR agent is liberated from said elastomer at the elevated temperature to create subsequent free radicals on the elastomer chain;
   an improvement which comprises addition of a free radical reactive compound (FRRC) to said rubber composition containing said CFR treated elastomer in said productive rubber mixing stage, wherein said FRRC is reactive with said subsequently created free radicals formed on said elastomer chain by liberation of said CFR agent at said elevated processing temperature, to thereby form a FRRC treated elastomer;
   wherein said CFR agent is comprised of 2,2,6,6-tetramethylpiperidine-1,4-diol and derivatives thereof so long as said derivatives contain nitroxide free radicals and are reactive with said created free radicals on said elastomer chain and 2,2,5,5-tetramethyl-1-pyrrolidinyloxy and derivatives thereof so long as said derivatives contain nitroxide free radicals and are reactive with said created free radicals on said elastomer chain;
   wherein said FRRC is comprised of at least one of, zinc acrylates, di-acrylates and tri-acrylates; triallyl cyanurates; triallyl phosphates; and high vinyl polybutadiene resin having a vinyl content in a range of from about 40 to about 80 percent.

2. The method of clam 1 wherein said CFR agent is comprised of 2,2,5,5-tetramethyl-1-pyrrolidinyloxy.

3. The method of claim 1 wherein said FRRC material is comprised of zinc dimethacrylate.

4. The method of claim 2 wherein said FRRC material is comprised of zinc dimethacrylate.

5. The method of claim 1 wherein said sulfur curable rubber is comprised of at least one of polymers and copolymers of isoprene and 1,3-butadiene and copolymers of styrene with at least one of isoprene and 1,3-butadiene.

6. The method of claim 1 wherein said sulfur curable rubber is comprised of at least one of cis 1,4-polyisoprene rubber, cis 1,4-butadiene rubber and styrene-butadiene rubber.

7. A rubber composition prepared by a method which comprises:
   A) mixing of rubber composition containing at least one sulfur curable elastomer comprised of at least one of polymers and copolymers of isoprene and 1,3-butadiene and copolymers of styrene with at least one of isoprene and 1,3-butadiene at an elevated temperature sufficient to create free radicals on the elastomer chain, in an at least one sequential preparatory rubber mixing stage in the absence of sulfur and sulfur curatives;
   (B) mixing sulfur curatives with the rubber composition in a subsequent productive rubber mixing stage;
   wherein a controlled free radical agent (CFR agent) is added to said rubber composition in at least one of said preparatory rubber mixing stage(s), wherein said CFR agent is a free radical-containing nitroxide compound reactive with said created free radicals on said elastomer chain to thereby form a CFR treated elastomer;
   (C) sulfur curing said mixed rubber composition at an elevated temperature during which said CFR agent is liberated from said elastomer at an elevated temperature to create subsequent free radicals on the elastomer chain;
   wherein a free radical reactive compound (FRRC) is added to said rubber composition containing said CFR treated elastomer in said productive rubber mixing stage, wherein said FRRC is reactive with said subsequently created free radicals formed on said elastomer chain by liberation of said CFR agent at said elevated processing temperature, to thereby form a FRRC treated elastomer;
   wherein said CFR agent is comprised of at least one of 2,2,6,6-tetramethylpiperidine-1,4-diol and derivatives thereof so long as said derivatives contain nitroxide free radicals and are reactive with said created free radicals on said elastomer chain and 2,2,5,5-tetramethyl-1-pyrrolidinyloxy and derivatives thereof so long as said derivatives contain nitroxide free radicals and are reactive with said created free radicals on said elastomer chain;
   wherein said FRRC is comprised of at least one of, zinc acrylates, di-acrylates and tri-acrylates; triallyl cyanurates; triallyl phosphates; and high vinyl polybutadiene resin having a vinyl content in a range of from about 40 to about 80 percent.

8. The rubber composition of claim 7 wherein said CFR agent is comprised of 2,2,5,5-tetramethyl-1-pyrrolidinyloxy.

9. The rubber composition of claim 7 wherein said FRRC material is comprised of zinc dimethacrylate.

10. The rubber composition of claim 8 wherein said FRRC material is comprised of zinc dimethacrylate.

11. The rubber composition of claim 7 wherein said sulfur curable rubber is comprised of at least one of cis 1,4-polyisoprene rubber, cis 1,4-butadiene rubber and styrene-butadiene rubber.

12. The rubber composition of claim 7 wherein said CFR agent is comprised of 2,2,5,5-tetramethyl-1-pyrrolidinyloxy, said FRRC material is comprised of zinc dimethacrylate and wherein said sulfur curable rubber is comprised of at least one of cis 1,4-polyisoprene rubber, cis 1,4-butadiene rubber and styrene-butadiene rubber.

13. A tire having at least one component comprised of the rubber composition of claim 7.

14. The tire of claim 13 wherein said component is comprised of at least one of internal tire sidewall component comprised of a tire apex or tire sidewall stiffening component spaced apart from a tire sidewall apex; a coating for a metal wire tire cord bead; coating for wire tire cord circumferential belts positioned between the tire tread and tire carcass.

15. The tire of claim 13 wherein the rubber composition of said tire component contains particulate filler reinforcement comprised of, based upon parts by weight per 100 parts by weight rubber (phr):
(A) from about 45 to about 110 phr of rubber reinforcing filler comprised of:
(1) rubber reinforcing carbon black, or
(2) a combination of rubber reinforcing carbon black and precipitated silica which contains from about 20 to about 80 phr of said silica, and
(B) silica coupler having a moiety reactive with hydroxyl groups on said silica and another different moiety interactive with at least one of said sulfur curable elastomer(s).

16. A tire having at least one component comprised of the rubber composition of claim 8.

17. A tire having at least one component comprised of the rubber composition of claim 9.

18. A tire having at least one component comprised of the rubber composition of claim 10.

* * * * *